No. 622,946. Patented Apr. 11, 1899.
C. K. FREER.
METHOD OF AND DEVICE FOR CONNECTING RAILWAY RAILS.
(Application filed July 16, 1898.)
(No Model.)

WITNESSES:
William P. Gaebel

INVENTOR
C. K. Freer
BY
ATTORNEYS.

UNITED STATES PATENT OFFICE.

CHARLES K. FREER, OF PORT CLINTON, OHIO.

METHOD OF AND DEVICE FOR CONNECTING RAILWAY-RAILS.

SPECIFICATION forming part of Letters Patent No. 622,946, dated April 11, 1899.

Application filed July 16, 1898. Serial No. 686,105. (No model.)

*To all whom it may concern:*

Be it known that I, CHARLES K. FREER, of Port Clinton, in the county of Ottawa and State of Ohio, have invented a new and Improved Method of and Device for Connecting Railway-Rails, of which the following is a full, clear, and exact description.

The object of my invention is to provide a means whereby the abutting ends of rails used in the construction of tracks for steam-propelled, electric, or horse-power vehicles may be quickly, economically, and firmly connected.

A further object of the invention is to provide a connecting device for railway-rails that will serve as a brace for the rails from one end to the other and which will prevent the ends of the rails over which the vehicles may pass from dropping lower down than the abutting or adjoining rails, thus obviating the hammering and jar incident to rails connected in the usual manner.

Another object of the invention is to so construct a fastening or tie device for railway-rails that the fish-plates may be made lighter than usual and be equally effective.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1:
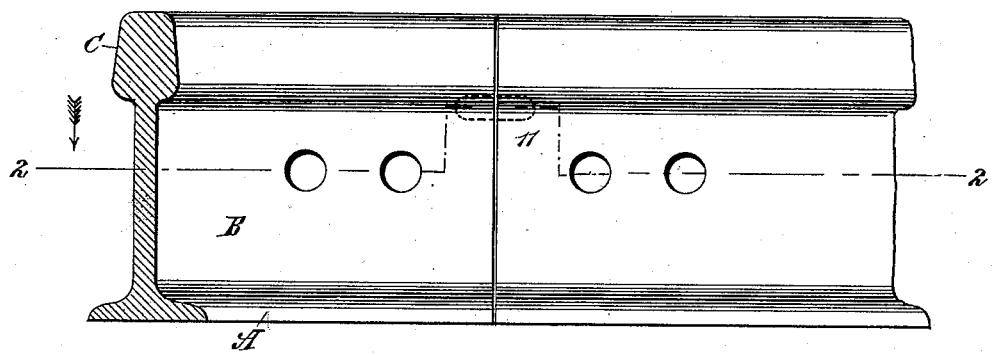
Figure 2:
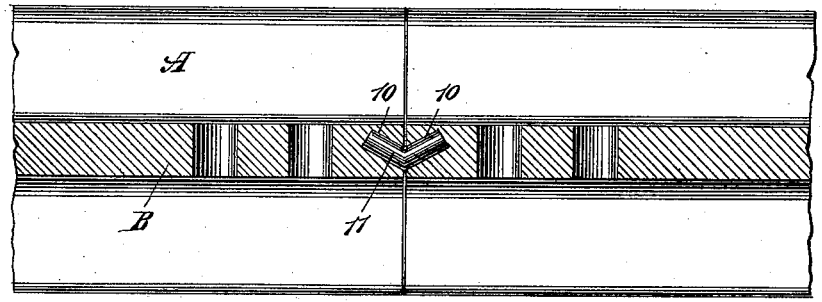

Figure 1 is a perspective view of the joint at the abutting end portions of two rails, illustrating the application of the improved device thereto; and Fig. 2 is a horizontal section taken particularly on the line 2 2 of Fig. 1, looking in direction of the flange of the rail.

A represents the flange of a railway-rail, B the web, and C the tread of the rail. Preferably in the ends of each rail, partially in the head and partially in the web, an angular or diagonal recess 10 is produced, the said recesses being so inclined that when the ends of the rails are brought together corresponding recesses in the abutting rails will be brought into registry at their outer ends. The tie for the rails consists of a plug 11, which when applied is straight and heated. One end of the plug is introduced while heated into the recess 10 of one rail, and the opposite end of the plug is made to enter the corresponding recess 10 of the abutting rail, the two rails being out of lateral alinement. The rails are then laterally forced together by hydraulic or other power until the tread-surfaces of the two rails are in the same horizontal plane and the ends are in contact, and by so forcing the rails together the tie-plug 11 is bent to an angular form and is made to conform to the recesses 10 in which its ends were entered.

Thus it will be observed, as shown in Fig. 2, that rails so joined together cannot sag, and their tread-surfaces are maintained at all times in the same horizontal plane. It is furthermore evident that the rails cannot be drawn apart unless the connecting-plug be separated, which may be done by chiseling the plug through the crevice produced at the abutting ends of the rails.

Having thus described my invention, I claim as new and desire to secure by Letters Patent—

1. The herein-described method of connecting railway-rails, which consists in introducing one end of a straight heated plug into one of oppositely-inclined recesses formed in the ends of the abutting rails, both recesses having a point of registry, and entering the opposite end of the plug into the mouth of the recess of a mating rail, and finally forcing the rails together until said rails are in longitudinal alinement, whereby the plug is bent and given an angular shape corresponding to the inclination of the combined registering recesses, the plug constituting a tie between the rail-sections, as set forth.

2. The combination, with abutting railway-rails provided with diagonally-located and oppositely-inclined recesses at their end portions, the recesses in the ends of the rails being so located that when the said rails are brought together the outer ends of the recesses will be in registry, of a plug adapted to be located within the said recesses and to conform to their combined contours, substantially as described.

3. The combination, with the abutting ends of railway-rails, the end portions of the rails being provided with diagonal recesses oppositely inclined and so arranged that the outer ends of the recesses are brought in registry when the rails are in alinement, of a plug comprising two members at angles to each other, one member being adapted to enter one of the said recesses and the other member the opposing recess, the plug being introduced into the recesses in a heated condition, substantially as described.

CHARLES K. FREER.

Witnesses:
 E. L. BRUNELL,
 T. C. KAESEMYER.